No. 729,872. PATENTED JUNE 2, 1903.
A. T. KELLER.
EXPANSION JOINT FOR ENGINES.
APPLICATION FILED MAR. 14, 1903.
NO MODEL.
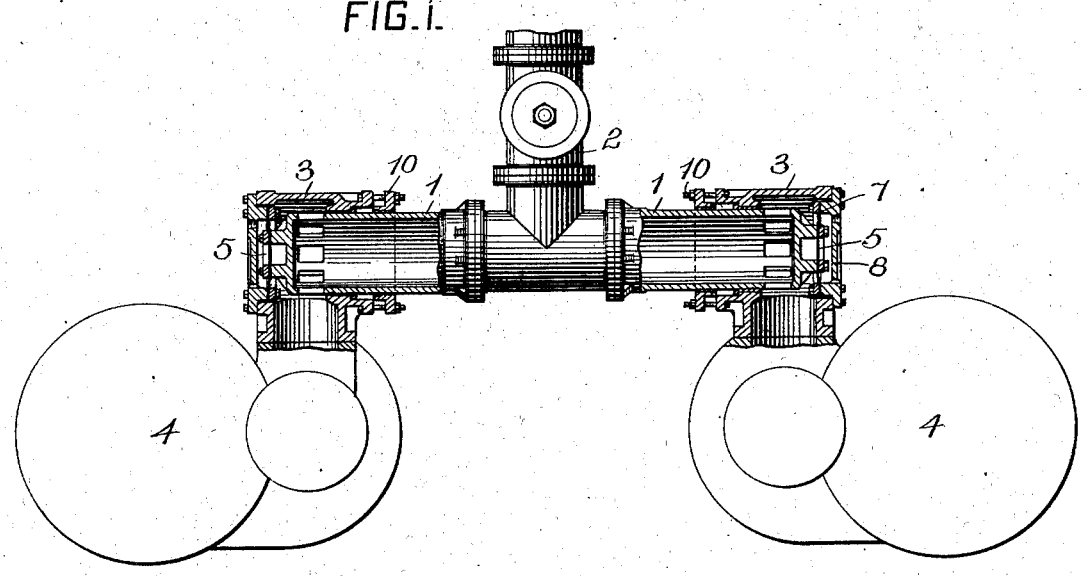
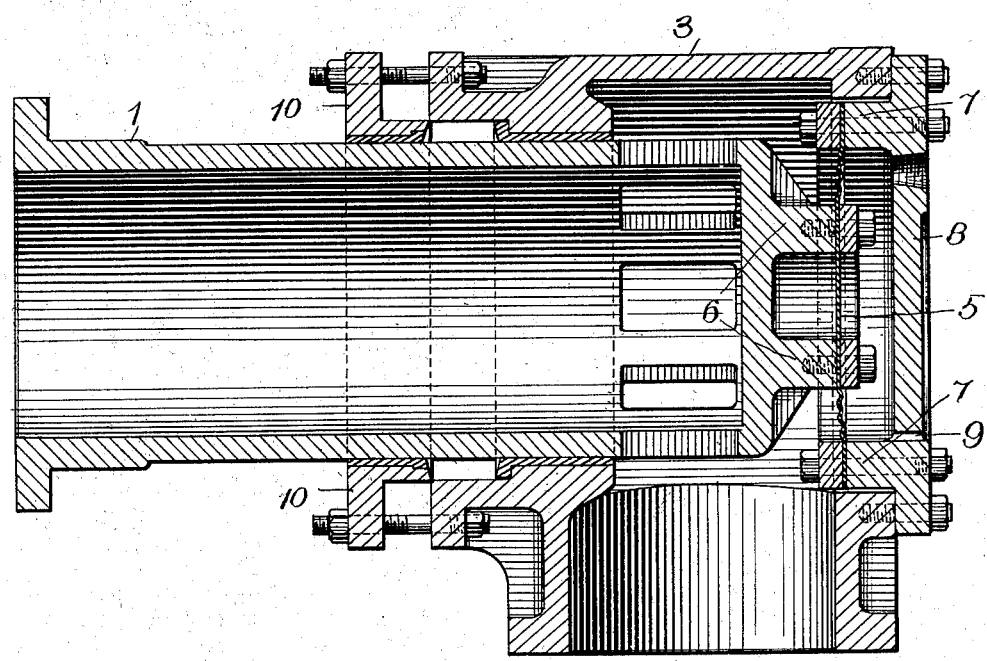
WITNESSES:
Herbert Bradley.
Fred H. Kirchner.
INVENTOR
Albert T. Keller
by Dennis Wolcott Att'y No. 729,872. Patented June 2, 1903.

UNITED STATES PATENT OFFICE.

ALBERT T. KELLER, OF WILKINSBURG, PENNSYLVANIA.

EXPANSION-JOINT FOR ENGINES.

SPECIFICATION forming part of Letters Patent No. 729,872, dated June 2, 1903.

Application filed March 14, 1903. Serial No. 147,752. (No model.)

*To all whom it may concern:*

Be it known that I, ALBERT T. KELLER, a citizen of the United States, residing at Wilkinsburg, in the county of Allegheny and State of Pennsylvania, have invented or discovered a certain new and useful Improvement in Expansion-Joints for Engines, of which improvement the following is a specification.

It is customary where twin cylinders are employed to connect them to the steam-supply pipe by branches extending therefrom. In order to prevent one or both of the cylinders from being pushed out of line, it is customary to employ a flexible connection between one of the cylinders and its supply branch to permit of the movement of the latter independent of the cylinder. One form of such connection consists of a sleeve connected to the cylinder and the branch supply-pipe passing through the sleeve, the portion within the sleeve being perforated. This construction is objectionable, for the reason that two stuffing-boxes or glands are required to maintain tight joints between the ends of the sleeve. In order to dispense with one of the stuffing-boxes, it has been proposed to merely insert one end of the branch pipe into a box or chamber connected to the cylinder. This construction is objectionable, as the pressure of the steam against the end of the pipe will tend to move the branch pipe longitudinally, and thereby shift the other cylinder.

The object of the present invention is to provide a connection wherein only one stuffing-box is necessary, and the pressure on the branch pipe is equalized without interfering with its movements, due to expansion and contraction.

The invention is hereinafter more fully described and claimed.

In the accompanying drawings, forming a part of this specification, Figure 1 is a view, partly in elevation and partly in section, illustrative of my improvement; and Fig. 2 is a sectional elevation, on an enlarged scale, of my improved expansion-joint.

In the practice of my invention one or both of the branches 1 of the supply-pipe 2 have their ends projecting into boxes or shells 3, which are connected with the steam-chests of the cylinders 4. The portion of the branch within the box or case is connected to a flexible diaphragm 5, secured at its edges within the box or shell. The area of the diaphragm exposed to pressure within the box is made approximately to the area of the branch or pipe against which steam-pressure would be effective to force the branch or pipe out of the box or shell. In the construction shown the end wall of the pipe or branch is formed with an annular projection 6, to which the diaphragm is attached, the edges of the diaphragm being secured steam-tight to the annular rim 7 on the head 8 of the box or shell. Openings 9 are formed through the head, so that no resistance except the resistance of the diaphragm and atmospheric pressure will oppose the expanding movement of the branch or pipe.

As the portion of the diaphragm exposed to steam-pressure is approximately equal to the area of the end wall of the pipe, the pressure against such wall tending to push the pipe out of the box or shell will be counterbalanced by the pressure in the opposite direction against the diaphragm. By this construction a perfect expansible joint is formed, using only one gland 10 and packing to form a tight joint where the branch or pipe enters the box or shell.

While not necessary it is desirable in many cases to provide an expansible connection for the steam-supply pipe with both cylinders, as when one of the branches is rigidly connected to one cylinder the expansion and contraction of the branch or pipe would impart lateral movement to the main steam-supply pipe 2.

I claim herein as my invention—

1. In an engine the combination of a cylinder, a box or shell connected to the cylinder, a flexible diaphragm arranged within the box or shell, and a pipe extending into the box or shell, and connected to the diaphragm, substantially as set forth.

2. In an engine the combination of two parallel cylinders, a box or shell connected to one of the cylinders, a pipe having one end extending into the box or shell and its opposite end connected to the other cylinder, and a flexible diaphragm secured within the box or shell and connected to the pipe, substantially as set forth.

In testimony whereof I have hereunto set my hand.

ALBERT T. KELLER.

Witnesses:
F. E. GAITHER,
DARWIN S. WOLCOTT.